US006119403A

United States Patent [19]

Klippert et al.

[11] Patent Number: 6,119,403

[45] Date of Patent: Sep. 19, 2000

[54] DEVICE FOR CONNECTING A MOTOR VEHICLE WINDOW PANE TO A WINDOW LIFTER

[75] Inventors: Uwe Klippert, Oberaula; Christian Saunus, Grunbach, both of Germany

[73] Assignee: Brose Fahrzeugteile GmbH & Co. KG, Coburg, Coburg, Germany

[21] Appl. No.: 09/469,948

[22] Filed: Dec. 21, 1999

[30] Foreign Application Priority Data

Dec. 23, 1998 [DE] Germany ........................... 198 06 745

[51] Int. Cl.[7] ........................... B60J 1/16

[52] U.S. Cl. ........................... 49/375; 49/506

[58] Field of Search ........................... 49/374, 375, 348, 49/349, 350, 351, 506

[56] References Cited

U.S. PATENT DOCUMENTS

| | | | |
|---|---|---|---|
| 5,363,595 | 11/1994 | Wirsing | 49/375 |
| 5,515,651 | 5/1996 | Hofmann et al. | 49/375 |
| 5,692,273 | 12/1997 | Rodde | 49/375 X |
| 5,848,496 | 12/1998 | Bertolini et al. | 49/375 X |
| 5,907,927 | 6/1999 | Lieb et al. | 49/375 |
| 5,987,820 | 11/1999 | Shibanushi | 49/375 |

FOREIGN PATENT DOCUMENTS

| | | |
|---|---|---|
| 28 36 038 | 2/1980 | Germany . |
| 31 08 557 A1 | 2/1982 | Germany . |
| 93 07 599 U | 9/1993 | Germany . |
| 44 23 440 A1 | 2/1995 | Germany . |
| 6-135228 | 5/1994 | Japan . |

*Primary Examiner*—Jerry Redman
*Attorney, Agent, or Firm*—Christie, Parker & Hale, LLP

[57] ABSTRACT

With a device for connecting a motor vehicle window pane, connected to a pane socket, to a window lifter which has a follower connected to the guide and transport element of the window lifter, the follower and the pane socket are connected together through at least two spatially separated positive locking elements which engage in succession in each other during assembly and with keyed connection in different directions. First positive locking elements are thereby connected with each other in the assembly direction of the window pane and second positive locking elements are aligned opposite relative to each other in a plane running substantially at right angles to the assembly direction of the window pane and are brought into engagement with each other through a swivel movement of the window pane after connection of the first positive locking elements. Third positive locking elements serve for the additional mechanical securement of the connection of the follower and pane socket and engage with each other when the window pane is partly or fully opened.

20 Claims, 4 Drawing Sheets

DEVICE FOR CONNECTING A MOTOR VEHICLE WINDOW PANE TO A WINDOW LIFTER

CROSS-REFERENCE

This application claims priority of German Application No. 198 60 745.8 filed Dec. 23, 1998, a copy of which is Attachment A hereto, the disclosure of which is incorporated fully herein by reference.

FIELD OF THE INVENTION

The invention relates to a device for connecting a motor vehicle window pane to a window lifter.

BACKGROUND OF THE INVENTION

From JP 6 135228 a device is known for connecting a motor vehicle window pane to a window lifter wherein the lower edge of the window pane is connected to two pane sockets which each have two spaced webs with a wedge-shaped tip. Two clip-like followers connected to a window lifter device have an inclined lead-in area and an undercut hollow cavity for holding with keyed engagement the wedge-shaped tips of the pane sockets connected to the window pane. As a result of the only slight keyed engagement between the wedge-shaped tips and the undercut hollow cavity, in order to secure the connection between the pane sockets and the followers a bore is provided penetrating through the arms of each follower to house a screw connection with which the arms of the followers are tensioned so that the position of the wedge-shaped tips of the pane sockets in the followers is secured.

With this known device for connecting a motor vehicle window pane to the followers of a window lifter it is necessary to align the positive locking elements of the pane sockets and the follower precisely relative to each other and in addition to tension the followers with force-locking engagement to secure the connection between the pane sockets and followers, which in turn necessitates visual contact with the connecting means and access to the followers during assembly. Connecting the window pane to the window lifter therefore requires an open door shaft and a longer assembly time which leads to considerable costs during assembly.

From DE 44 23 440 A1 a device is known for connecting a motor vehicle window pane to the guide device of a window lifter where in the region of the lower edge of the window pane a cylindrical connecting element is connected to the window pane and the guide device has, perpendicular to the plane of the pane, spring-elastic retaining arms with an incline for guiding in the connecting element. Recesses provided in the spring-elastic retaining arms serve to hold the connecting element in the fastening state where the connection between the connecting element and recesses is produced by the connecting element snap-fitting into the recesses.

The positive-locking detent connection between the connecting element and the retaining arms does not require any additional tensioning of the retaining arms to secure the connection, and the guide-in phase at the upper ends of the retaining arms allows a rough pre-adjustment so that the connection between the window pane and the guide device of a window lifter can also be carried out without any visual contact. Blind fitting when fastening the window pane on the window lifter is thus possible and no open door shaft is required during assembly.

SUMMARY OF THE INVENTION

The object of the present invention is to provide a device for connecting a motor vehicle window pane, connected to a pane socket, to a window lifter of the type already mentioned which allows blind fitting, is characterized by high stability and high resistance moment across the plane of the pane and guarantees a secure connection between the window pane and window lifter even with tilting movements of the window pane.

The solution according to the invention allows a blind fitting when connecting the motor vehicle window pane to a window lifter, i.e. assembly is possible even in the absence of visual contact with the connecting means, for example in the case of a closed door shaft of a motor vehicle door. It ensures a high resistance moment across the plane of the pane through a large surface area connection of the window pane with the window lifter through the spatially separated positive locking elements and a secure connection, even in the event of tilting movements of the window pane, through the positive locking elements which can be connected together with keyed engagement in different directions. The device according to the invention is particularly suitable for frameless vehicle doors where the window pane is exposed as a result of the absence of side guides to additional tilting movements perpendicular to the plane of the pane.

Since according to a further feature of the invention the positive locking elements enter into engagement in succession when connecting the window pane to the window lifter, a simple and reliable assembly is guaranteed where the fitter can also control and monitor the individual assembly steps and thus the completion of the connection without any visual contact.

Preferably first positive locking elements are provided for bringing together and/or aligning the follower and the pane socket while second positive locking elements are provided for locking the connection between the follower and pane socket. Through the spatial separation and different function of the positive locking elements handling becomes easier during assembly and the combination of the different function parts of the positive locking elements, ensures a secure connection between the window pane and window lifter.

One advantageous development of the solution according to the invention is characterized in that the first positive locking elements can be connected together with keyed engagement in the assembly direction of the window pane and that the second positive locking elements are aligned oppositely to each other in a plane running substantially at right angles to the assembly direction of the window pane and can be brought into engagement after connection of the first positive locking elements through a swivel movement of the window pane.

This design of the solution according to the invention allows the fitter to insert the window pane, with the pane socket fixed thereon, into a door shaft of a motor vehicle door until keyed connection of the first positive locking elements, and then to produce a keyed connection of the second positive locking elements by swivelling the window pane around the first keyed connection. Instead of swivelling the window pane it is also possible to press on the pane socket and follower in the case of an opened door shaft.

Through the different alignment of the positive locking elements which engage in each other with keyed connection, on the one hand, in the assembly direction and, on the other, at right angles to the assembly direction, a secure connection is guaranteed between the window pane and window lifter even with different force action on the window pane. Thus this design is particularly suitable for frameless door systems and ensures an increased protection against theft since the window pane, even in the partly opened state, cannot be forcefully removed from the locking action with the window lifter.

An advantageous development of the solution according to the invention is characterized in that third positive locking elements are provided for the additional mechanical securement of the connection between the follower and pane socket and which engage with each other when the window pane is partly or completely opened.

The arrangement of an additional mechanical securement which is active particularly in the case of a partly or fully opened window pane prevents the window pane from tilting even in the event of extreme loads and also prevents forced release of the connection between window pane and window lifter so as to ensure further improved protection against theft.

With a method for connecting a motor vehicle window pane to a window lifter which is mounted in a door shaft of the vehicle door defined by an outer door panel and an inner door panel, a door module or an inner door trim and which has at least one follower connected to the guide and transport means of the window lifter and holding the window pane, the window pane is connected in the region of its lower edge to a pane socket and is inserted together with the pane socket into the door shaft where it is pushed into the door shaft until the positive locking elements which are mounted on both the pane socket and on the follower stand opposite one another. The follower and the pane socket are brought into a stop position with keyed connection of one part of the positive locking elements and then oppositely aligned further positive locking elements are brought into engagement with each other by swivelling the window pane.

These method steps for connecting a vehicle window pane to a window lifter ensure simple fitting and allow blind fitting without visual contact of the connecting elements, ensure a fixed connection between the vehicle window pane and window lifter even with great forces acting on the plane of the pane and enable the control and monitoring of the secure connection through successive assembly steps of which the first assembly step has to be completed before the second assembly step is possible and the completion of the second assembly step is indicated by a discernible or audible connection of the additional positive locking elements.

A further advantageous development of the method according to the invention is characterized in that the window pane is pushed so far into the door shaft until corresponding first positive locking elements on the pane socket and on the follower engage in each other, and that the window pane is swivelled about the keyed connection of the first positive locking elements until the oppositely aligned further positive locking elements engage with each other and lock with each other.

BRIEF DESCRIPTION OF THE DRAWINGS

The idea on which the invention is based will now be explained in further detail with reference to the embodiments shown in the drawings in which.

DETAILED DESCRIPTION

Figure 1:
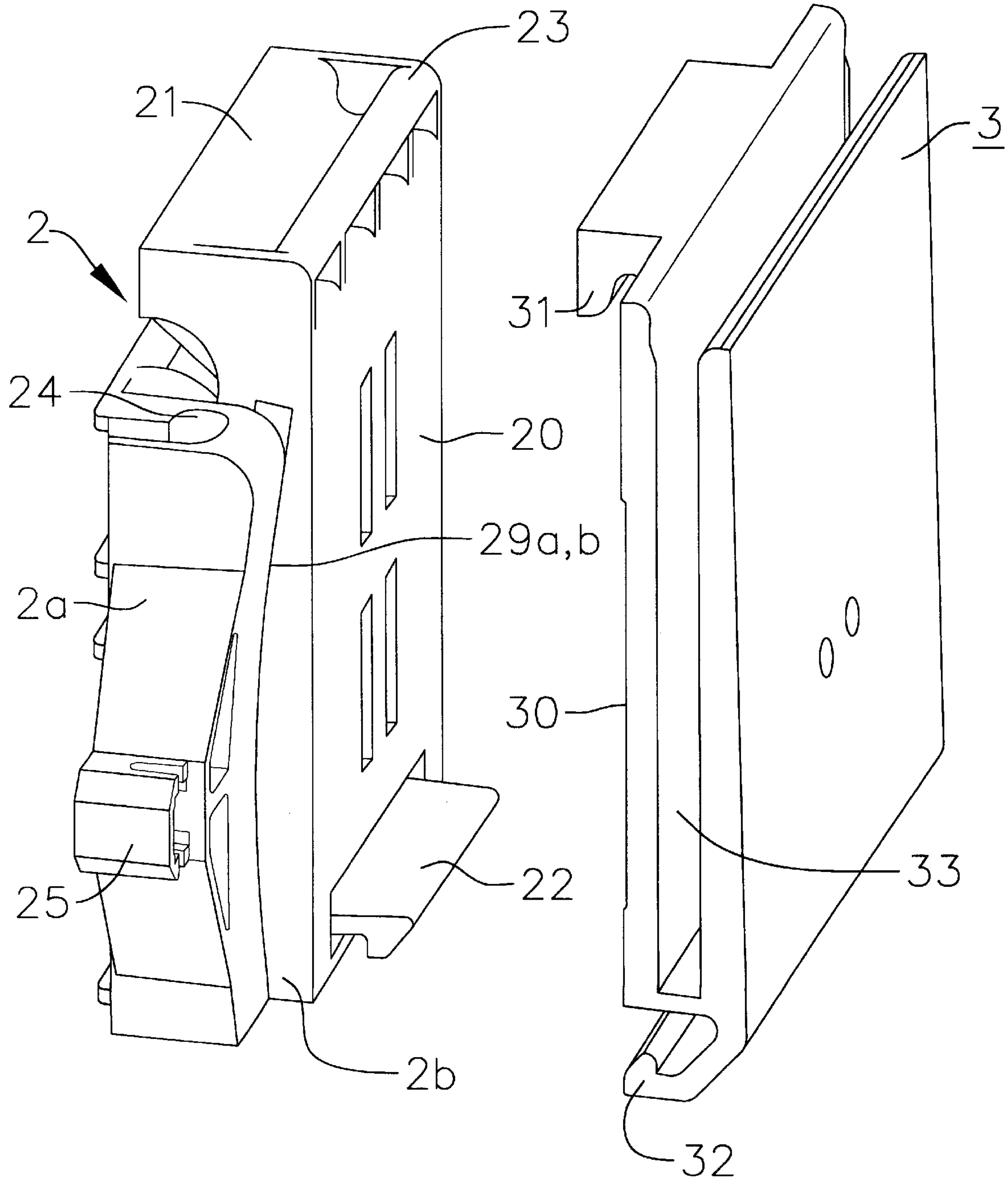
FIG. 1 is a diagrammatic perspective view of a connecting device with two spatially separated positive locking elements which are aligned in different connecting directions relative to each other.

FIG. 1 shows in perspective view a follower 2 and a pane socket 3 for connecting a motor vehicle window pane to a window lifter. A motor vehicle window pane (not shown) is inserted in the shaft 33 formed by two side arms of the pane socket 3 and a base surface, and where applicable, is connected by additional fastening means to the pane socket 3, for example, by sticking or by further positive-locking connecting means. The follower 2 consists in the illustrated embodiment of a basic follower body 2*a* and a coupling body 2*b* which are connected together in the longitudinal direction by a concave/convex connecting surface 29*a*, 29*b*. The basic follower body 2*a* is connected through a guide slit 24 to a window lifter guide rail and has a cable mounting 25 in which a window lifter cable is hung for moving the follower 2 and thus the window pane up and down.

The coupling body 2*b* of the follower 2, which is to be connected to the pane socket 3, has on its upper edge a trough 21 which corresponds to a hook 31 of the pane socket 3. The trough 21 and hook 31 form first positive locking elements to connect the follower 2 and pane socket 3.

As second positive locking elements, a detent nose 22 is provided on the coupling body 2 and a detent hook 32 is provided on the pane socket 3 in the region of the lower edge of the follower 2 and pane socket 3. In the embodiment illustrated in FIG. 1, the detent nose 22 is movable elastically perpendicular to the contact bearing faces 20, 30 of the follower 2 and pane socket 3 so that when bringing together the follower 2 and pane socket 3 so that their bearing faces 20, 30 adjoin one another, the bent end of the detent hook 32 deflects the detent nose 22 and when pressing together the pane socket 3 and follower 2 the detent nose 22 and detent hook 32 hook together with snap-fitting engagement.

Figure 4:
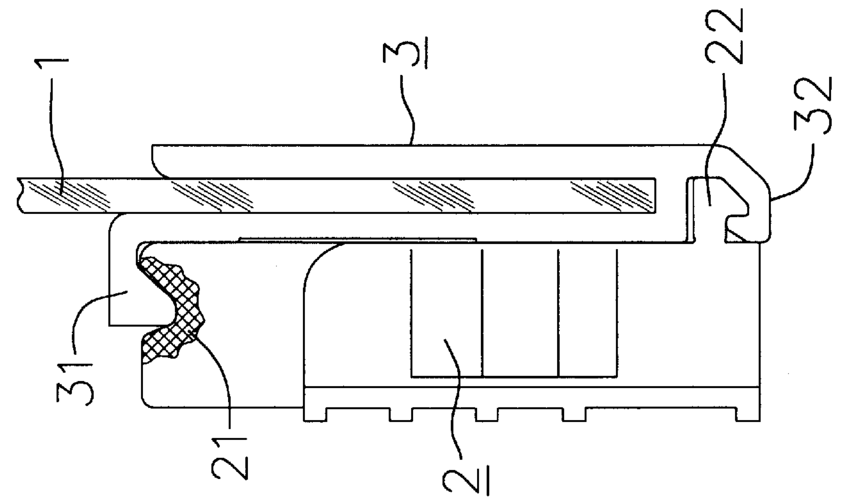
FIGS. 2 to 4 show a diagrammatic view of the individual movement phases when making a keyed connection between a follower and a pane socket.
Figure 3:
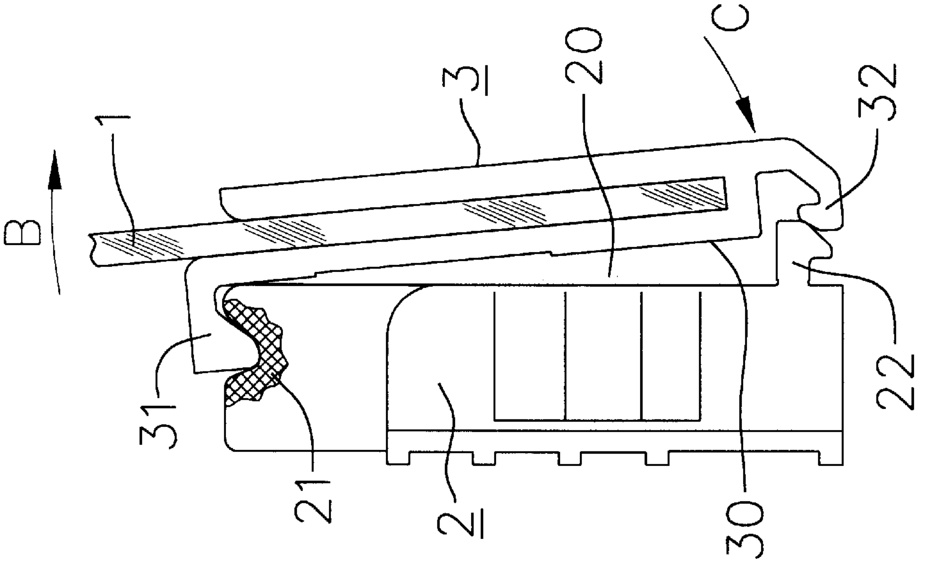
Figure 2:
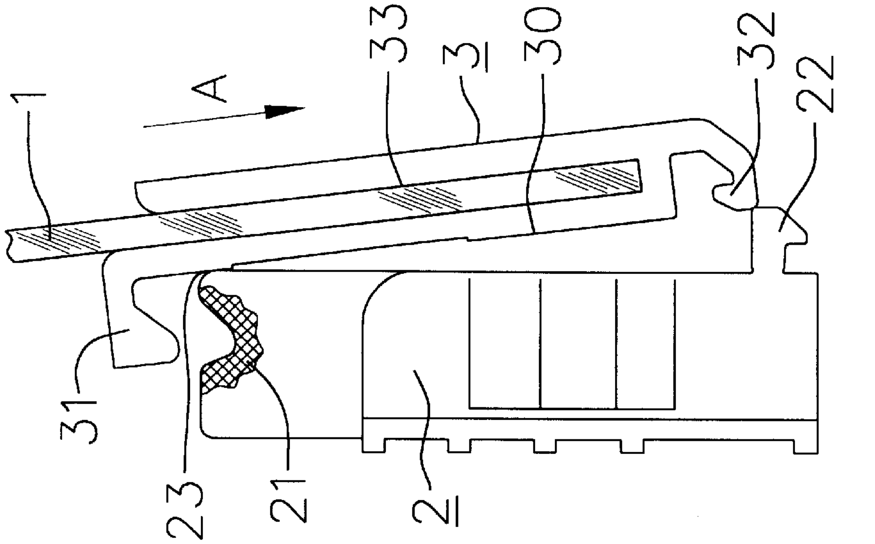

FIGS. 2 to 4 show the individual movement phases when joining the pane socket 3 and follower 2 according to FIG. 1.

Before making the connection between the follower 2 and pane socket 3, the pane socket 3 is pushed with the shaft 33 onto the lower edge of the window pane 1 and is connected to same in a suitable way with keyed and/or force-locking connection, preferably by adhesive. The follower 2 is connected to the guide rails and to a transport device, for example the cable, of a window lifter and is mounted inside the door shaft on the motor vehicle door.

The window pane 1 is inserted with the pane socket 3 fixed thereon through the upper slit of the door shaft of the vehicle door and is pushed in the direction of arrow A in FIG. 2 into the door shaft. When inserting the window pane 1 and pane socket 3 into the door shaft, the contact bearing face 30 of the pane socket 3 slides along the upper edge 23 of the follower 2 or along the contact bearing face 20 until the hook 31 of the pane socket 3 slides into the trough 21 formed on the top side of the follower 2 and finally makes a positive locking connection with the trough 21 according to FIG. 3.

The keyed connection between the hook 31 of the pane socket 3 and the trough 21 of the follower 2 is thus designed so that the pane socket 3 can swivel about the turning point formed between the hook 31 and trough 21. By pressing the lower edge of the pane socket 3 in the direction of arrow C or preferably by swivelling the window pane 1 in the direction of the arrow B, according to FIG. 3, the detent hook 32 at the lower end of the pane socket 3 presses against the elastically movable detent nose 22 of the follower 2 so that the detent nose 22 is deflected. With further pressure on the pane socket 3 and tilting of the window pane 1 the projections of the detent nose 22 and of the detent hook 32 engage in each other with snap-fit connection.

FIG. 4 shows the keyed connection between the first and second positive locking elements 21, 31 and 22, 32 and thus the fixed connection between the pane socket 3 and follower 2.

Figure 5:
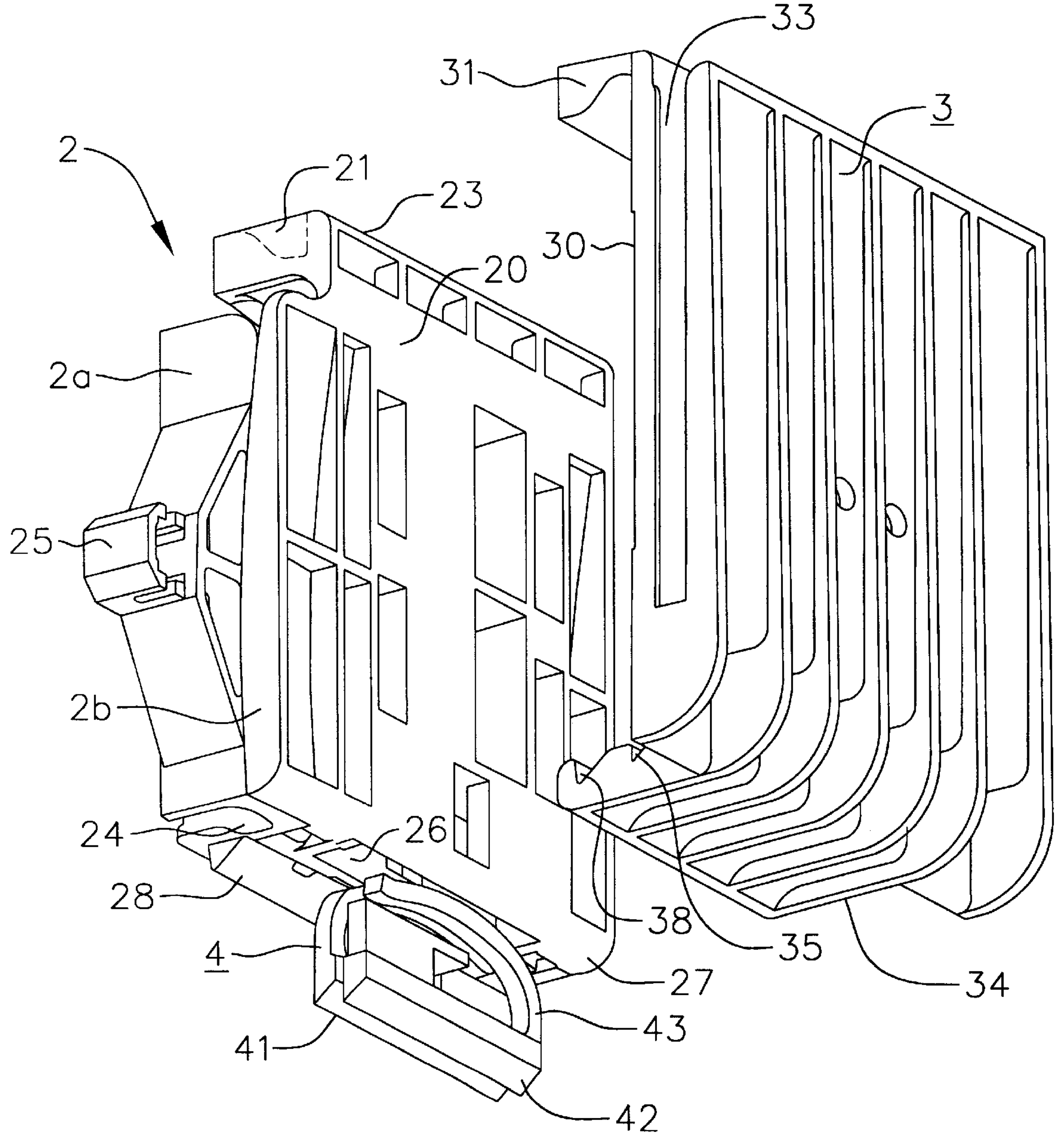
FIG. 5 shows a diagrammatic perspective view of a further connecting device with additional mechanical securement.
Figure 6:
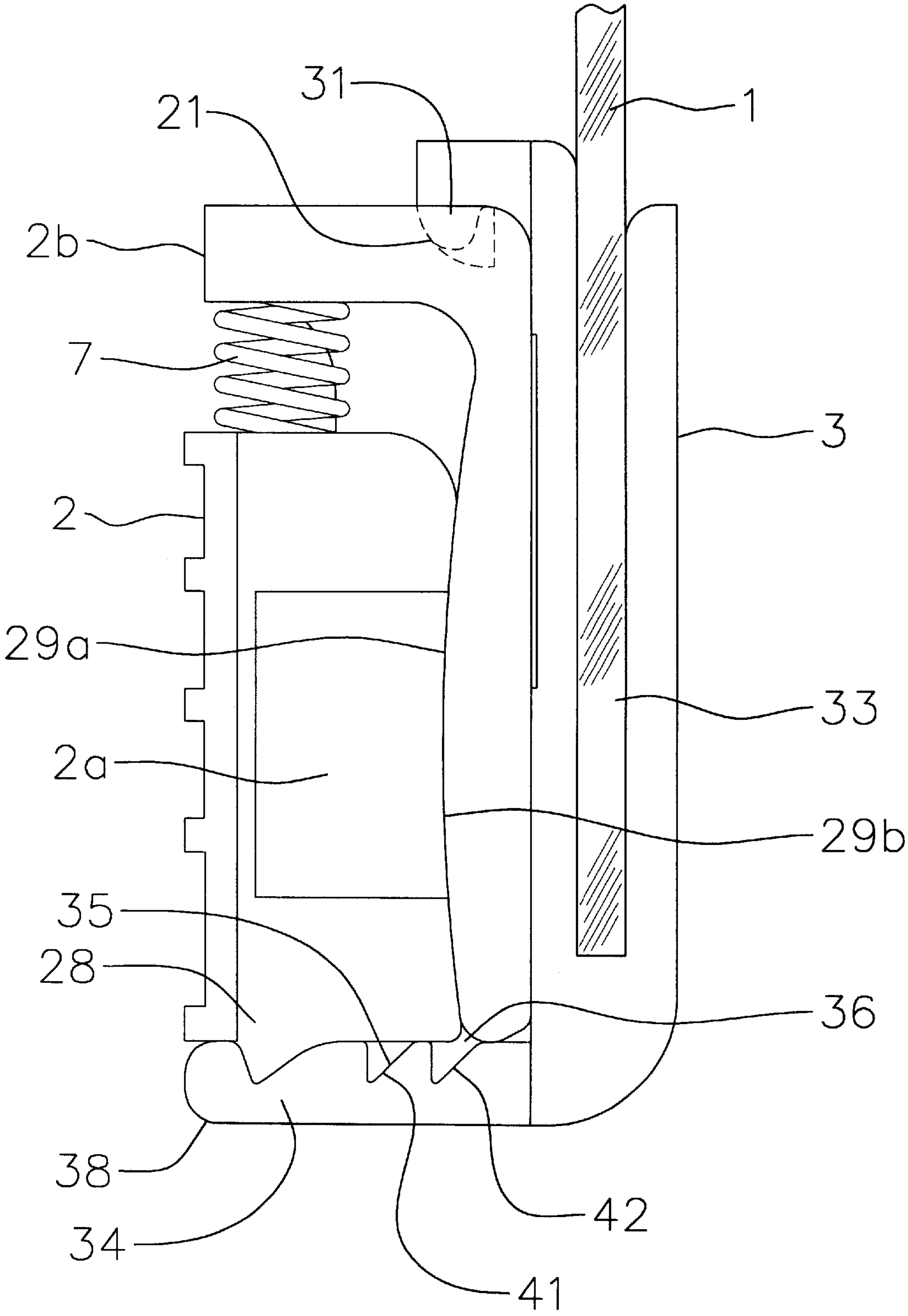
FIG. 6 is a side view of the connecting device according to FIG. 5 in the assembled state.

FIG. 5 shows in a perspective view and FIG. 6 shows in a side view a follower 2 and a pane socket 3 which are connected together by several positive locking elements 21, 31; 35, 36, 41, 42; 28, 38 so that the follower 2 and the pane socket 3 are connected fixed together at their contact bearing faces 20, 30. The follower 2 and the pane socket 3 are system components of a displacement device with force-dependent adjustment of a motor vehicle window pane 1, which in the event of a pretensioning force provided by a spring 7 being exceeded, executes a swivel movement of the window pane 1 so that the window pane 1 in the closed state presses against a door seal. This system is particularly suitable for frameless door systems where the window pane 1 is not guided in side guide slits of a door frame but adjoins with sufficient tightness against the door seal.

The window pane 1 is connected fixed to the pane socket 3 through a socket shaft 33 of the pane socket and forms one unit with the pane socket 3 prior to its connection with the follower 2.

The follower 2 consists of a basic follower body 2*a* and a coupling body 2*b* which are connected together for sliding movement in the longitudinal direction through a concave/convex shaped connecting surface 29*a*, 29*b*. Between the angled upper edge of the coupling body 2 and the upper edge of the basic follower body 2*a* is a spring 7 which presses the upper edges of the coupling body 2*b* and basic follower body 2*a* apart with predetermined pretension force and pretensions the two elements against each other.

The basic follower body 2*a* is connected to the guide rail through a guide slit 24 and to the transport cable of a window lifter through a cable mounting 25.

Underneath the follower 2 is a recess 26 in which a detent plate 4 can be inserted with a spring-elastic yoke 43. As a result of the spring-elastic yoke 43, the detent teeth 41, 42 formed on the detent plate 4 are mounted resiliently perpendicular to the lower edge of the follower 2. The detent teeth 41, 42 correspond with the teeth 35, 36 on the underneath projection 34 of the pane socket 3.

While the detent plate 4 is inserted underneath the coupling body 2*b*, a security detent tooth 28 is formed underneath the basic follower body 2*a* to correspond with a security detent tooth socket 38 on the underneath projection 34 of the pane socket 3. The security detent tooth 28 and the security detent tooth socket 38 are formed asymmetric and have inclined insert guides which, as described below, connect the basic follower body 2*a* and the coupling body 2*b* together with adjustment during displacement of the window pane.

A first positive locking element in the form of a trough 21 is formed on the top side of the coupling body 2*b*, into which a hook 31 of the pane socket 3 engages in the manner described above in connection with the variation according to FIG. 1.

Before connecting the coupling body 2*b* of the follower 2 with the pane socket 3, the pane socket 3 is pushed with the shaft 33 onto the lower edge of a window pane 1 and connected thereto. The basic follower body 2*a* is connected to the guide rails and to a transport device, for example the transport cable, of a window lifter and is installed together with the window lifter in the door shaft of a motor vehicle door.

The window pane 1 is inserted with the pane socket fixed thereon through the upper slit of the door shaft of the motor vehicle door and pushed into the door shaft. When inserting the window pane 1 and the pane socket 3 into the door shaft, the contact bearing face 30 of the pane socket 3 slides along the upper edge 23 of the coupling body 2*b* until the hook 31 of the pane socket 3 slides into the trough 21 formed on the top side of the follower 2, and finally produces a keyed connection with the trough 21 in which the pane socket 3 can swivel about the rotary point formed between the hook 31 and trough 21.

By pressing on the lower edge of the pane socket 3 or—in the case of blind fitting—by swivelling the window pane 1 about the rotary point formed between the trough 21 and hook 31, the detent sockets 35, 36 and 38 slide over the resiliently pliable detent teeth 41, 42 of the detent plate 4 until the security detent socket 38 snaps over the security detent tooth 28 on the surface underneath the basic follower body 2*a* through the adequate elasticity of the underneath projection 34 of the pane socket 3, and the detent teeth 41, 42 and 28 produce a keyed connection with the detent sockets 35, 36 and 38.

The separation of the follower 2 into a coupling body 2*b* connected to the pane socket 3 and a basic follower body 2*a* connected to the window lifter enables the window pane 1 to swivel on reaching an upper end position of the window lifter corresponding to the closing position of the window pane 1.

If in this position further displacement force is exerted through the transport cable onto the basic follower body 2*a* which is connected to the transport cable of the window lifter by the cable socket 25, then the upper edges of the coupling body 2*b* and the basic follower body 2*a*, which are spaced from each other through the spring force of the spring 7, are moved up towards each other against the pretensioning force of the spring 7 so that the convex guide face of the coupling body 2*b* slides along on the concave guide face of the follower 2*a* and thus the coupling body 2*b* executes a swivel movement about a rotary point lying outside of the follower 2 and pane socket 3 and the window pane 1 is swivelled against the door seal.

In the event of interaction between the basic follower body 2*a* and the coupling body 2*b*, the security detent tooth 28 and the security detent tooth socket 38 execute a double function. Apart from the additional mechanical securement described above, manufacturing tolerances of the individual components of the adjustment device are compensated since the security detent tooth 28 has a self-locking incline which includes an angle of, for example, 7 degrees relative to the vertical and the security detent tooth socket 38 has lead-in incline whose angle corresponds to the angle of the self-locking incline relative to the vertical.

When the displacement device reaches an upper end stop, the basic follower body 2*a* is moved against the pretensioning force of the spring 7 and the coupling body 2*b* swivels together with the pane socket 3. If the vehicle window pane is moved back from the end stop then the window pane is first swivelled into the movement position where the basic follower body 2*a* is moved in the opposite direction under the effect of the pretensioning force of the spring 7. The security detent tooth 28 thereby slides on the inclined surface and lead-in incline of the security detent tooth socket 38 into the security detent tooth socket 38.

Through the inclined surface of the security detent tooth 28 and the lead-in incline of the security detent tooth socket 38 during further movement, the basic follower body 2*a* and coupling body 2*b* as well as the pane socket, 3 are drawn together under the action of the pretensioning force of the spring 7 and any existing tolerances are compensated in this way.

What is claimed is:

1. Device for connecting a motor vehicle window pane to a window lifter, the device comprising:

at least one follower to connect to the window lifter a pane socket with a socket shaft configured to receive the window pane;

wherein the at least one follower and the pane socket include a first set of positive locking elements, and a second set of positive locking elements spatially separated from the first set of positive locking elements, wherein the first set of positive locking elements engage with keyed connection in a first direction to connect the at least one follower and the pane socket, wherein the second set of positive locking elements engage with keyed connection in a second direction which is different from the first direction to connect the at least one follower and the pane socket.

2. Device according to claim 1 wherein when connecting the window pane with the window lifter the device has a first position wherein the first set of positive locking elements are engaged and the second set of positive locking elements are spaced apart, and a second position wherein the first and second sets of positive locking elements are both engaged.

3. Device according to claim 2 wherein the first set of positive locking elements at least one of bring together and align the follower and pane socket and the second set of positive locking elements lock the connection between the follower and pane socket.

4. Device according to claim 3 wherein the first set of positive locking elements are connected together in keyed engagement in an assembly direction of the window pane, wherein the second set of positive locking elements are aligned relative to each other in a plane running substantially perpendicular to the assembly direction of the window pane, and wherein the pane socket swivels to move the device between the first position and the second position.

5. Device according to claim 4 wherein the first set of positive locking elements have a guide-in region that aligns the second set of positive locking elements of the follower and of the pane socket relative to each other when the device is in the first position.

6. Device according to claim 2 wherein at least one of the sets of the positive locking elements has a first part that is spring elastic and a second part that is a corresponding counter positive locking element to the first part, wherein when moving between the first position and the second position the first part of the positive locking elements yields resiliently and snap fits with the corresponding counter positive locking element.

7. Device according to claim 1 wherein the at least one follower and the pane socket include a third set of positive locking elements that provide additional mechanical securement of the connection of the follower and pane socket, and which engage with each other when the window pane is at least partly opened.

8. Device according to claim 7 wherein the first set of positive locking elements are arranged on the follower and on the pane socket in relation to at least one of the second set of positive locking elements and the third set of positive locking elements, such that when bringing together the follower pane socket, the first set forms a first stop with keyed connection perpendicular to the plane of the window pane, and at least one of the second set of positive locking elements and the third set of positive locking elements are thereby aligned.

9. Device according to claim 7 wherein the third set of positive locking elements are mounted next to the second set of positive locking elements underneath the follower and pane socket, and the third set has a security detent tooth socket on the pane socket and a security detent tooth of the follower which engages with sliding movement into the security detent tooth socket of the pane socket, wherein a tooth height of the security detent tooth is greater than a tooth height of the detent teeth of the second set of positive locking elements.

10. Device according to claim 9 wherein the security detent tooth socket and the security detent tooth are formed asymmetric to compensate manufacturing tolerances and each have a mutual lead-in incline, wherein the security detent tooth of the follower slides over the incline into the security detent tooth socket of the pane socket when the pretensioning element relaxes.

11. Device according to claim 10 wherein the follower has a coupling body connected to the pane socket and a basic follower body connected to the window lifter, the device further comprising a pretensioning element coupling the coupling body and the basic follower body, wherein the security detent tooth slides into the security detent tooth socket when the pretensioning element relaxes.

12. Device according to claim 7 wherein the follower has a coupling body which is connected to the pane socket through the first and second set of positive locking elements, and a basic follower body which is connected with keyed engagement to a guide rail of the window lifter, wherein the device further comprises a pretension element connecting the coupling body to the basic follower body, and wherein the coupling body is supported with sliding movement on the basic follower body in a direction of movement of the follower and in a direction at substantially right angles to a surface of the window pane, and that the third set of positive locking elements connect the basic follower body and the coupling body together in dependence on a relative position between the basic follower body and the coupling body.

13. Device according to claim 12 wherein the coupling body has a curved guide face opposite the pane socket, and the basic follower body has a connection to a guide rail, and a curved guide face opposite the guide rail connection, wherein the bodies are connected together through the curved guide faces running along a displacement direction on which the coupling body slides along relative to the basic follower body against pretensioning force of the pretensioning element.

14. Device according to claim 1 wherein the first set of positive locking elements has a trough mounted at an upper end of the follower, and a hook mounted at an upper end of the pane socket, and wherein the hook projects beyond contact bearing faces of the follower and pane socket, which adjoin one another in an assembled state, to engage in the trough when the follower and pane socket are brought together.

15. Device according to claim 1 wherein the second set of positive locking elements has a detent hook mounted at a lower end of the pane socket, and a detent nose mounted at a lower end of the follower, wherein the detent nose projects over contact bearing faces of the follower and pane socket which adjoin one another in an assembled state, wherein the detent hook which is mounted at the lower end of the pane socket, corresponds with the detent nose and, in the assembled state of the follower and pane socket, hooks onto the detent nose.

16. Device according to claim 15 wherein at least one of the detent hook and the detent nose is formed resilient.

17. Device according to claim 1 wherein underneath the follower is a recess, wherein the device further comprises a cogged detent plate insertable in the recess, wherein the second set of positive locking elements has detent teeth on the cogged detent plate, and teeth mounted underneath the pane socket that project over contact bearing faces of the follower and pane socket.

18. Device according to claim 17 wherein the detent plate is inserted resiliently into the recess underneath the follower.

19. Method for connecting a motor vehicle window pane to a window lifter which is mounted in a door shaft of a vehicle door the method comprising:

connecting at least one follower to the window lifter;

inserting a lower edge of the window pane into a socket shaft of a pane socket;

inserting the pane together with the pane socket into the door shaft, wherein the pane socket is pushed into the door shaft until positive locking elements which are mounted on both the pane socket (3) and the follower stand opposite one another;

bringing the follower and the pane socket into a stop position with keyed connection of one set of the positive locking elements; and swivelling the window pane to engage an oppositely aligned additional set of positive locking elements.

20. Method according to claim 19 wherein the window pane is pushed into the door shaft until a mutually corresponding first set of positive locking elements on the pane socket and on the follower engage in each other in keyed connection, and wherein the window pane is swivelled about the keyed connection of the first set of positive locking elements until the oppositely aligned additional set of positive locking elements engage in each other and snap-fit with each other.

* * * * *